United States Patent [19]

Farnsworth et al.

[11] Patent Number: 4,628,903
[45] Date of Patent: Dec. 16, 1986

[54] PULSE COMBUSTION DEEP FAT FRYER

[75] Inventors: Craig A. Farnsworth, Chagrin Falls; Robert L. Himmel, Cleveland, both of Ohio; Gerald W. Sank, Pasadena; Keith A. Stanger, Glen Burnie, both of Md.

[73] Assignee: Gas Research Institute, Chicago, Ill.

[21] Appl. No.: 734,285

[22] Filed: May 15, 1985

[51] Int. Cl.$^4$ .............................................. A47J 27/00
[52] U.S. Cl. ................................. 126/391; 431/1; 126/343.5 A; 126/390
[58] Field of Search ........... 126/390, 391, 357, 350 R, 126/343.5 R, 360 R; 99/403, 359; 431/1

[56] References Cited

U.S. PATENT DOCUMENTS

| | | | |
|---|---|---|---|
| 2,053,568 | 9/1936 | Levin | 126/391 X |
| 2,452,472 | 10/1948 | Keating | 126/391 |
| 2,465,953 | 3/1949 | Wollner | 126/391 |
| 2,478,732 | 8/1949 | Wilson et al. | 126/391 |
| 2,540,339 | 2/1951 | Kritzer | 126/391 X |
| 3,190,340 | 6/1965 | Fritsch | 431/1 |
| 3,554,182 | 1/1971 | Whitacre | 431/1 |
| 3,760,793 | 9/1973 | Anetsberger et al. | 126/391 |
| 4,091,301 | 5/1978 | Lazaridis et al. | 126/391 |
| 4,228,730 | 10/1980 | Schindler et al. | 126/391 |
| 4,397,299 | 8/1983 | Taylor et al. | 126/391 |
| 4,550,711 | 11/1985 | Griffiths | 126/391 |
| 4,574,745 | 3/1986 | Belles | 431/1 |

FOREIGN PATENT DOCUMENTS

| | | | |
|---|---|---|---|
| 707401 | 5/1966 | Italy | 99/403 |
| 2098465 | 11/1982 | United Kingdom | 99/403 |

Primary Examiner—James C. Yeung
Assistant Examiner—H. A. Odar
Attorney, Agent, or Firm—Pearne, Gordon, Sessions, McCoy, Granger & Tilberry

[57] ABSTRACT

A deep fat fryer includes an open-top vessel having at least one trough-shaped container adapted to hold a quantity of cooking oil. A pulse combustion burner is provided for heating the oil and includes a combustion chamber adapted to be immersed in the oil. A mixer head receives controllable air and fuel flows and an ignitor within the mixer head initiates combustion. A cabinet is provided for supporting the vessel and the burner. A tailpipe receives the combustion products and carries the same into an exhaust decoupler which is located adjacent the inlet end of the combustion chamber and which substantially enclosed the mixer head and at least a portion of a vent pipe. The exhaust decoupler and the tailpipe are arranged in heat exchange relationship with the vessel wall. A continuously operating air blower is provided to minimize burner start-up time and to cool electronic control circuitry used to regulate the oil temperature and the operating periods of the burner.

22 Claims, 4 Drawing Figures

PULSE COMBUSTION DEEP FAT FRYER

TECHNICAL FIELD OF THE INVENTION

The invention relates generally to combustion heating apparatus. More particularly, the invention relates to a gas-fired pulse combustion heater used in a deep fat fryer.

BACKGROUND OF THE INVENTION AND PRIOR ART

Pulse combustion technology has been widely utilized in heating units such as water heaters using natural gas or other gaseous fuels as well as liquid fuels. In pulse combustion burners of the Helmholtz type, a combustion chamber of a given size is connected to an exhaust or tailpipe of given length having a cross section somewhat less than that of the combustion chamber. An oscillating or pulsed flow of gasses through the burner is maintained by explosive combustion cycles in the chamber which by thermal expansion of the gaseous combustion products drives such products from the chamber and out of the exhaust pipe. Pulse combustion burners are generally characterized by high overall efficiency and high heat transfer characteristics. The high heat transfer properties of such burners are generally attributed to relatively high degrees of turburlence in the flow of combustion products which results from the high velocities and cyclic flow reversal of these combustion gases.

In order for the pulse combustion process to be self-sustaining, the burner is designed to operate in a resonant manner. The design parameters for a pulse combustion burner are established by the Hemholtz equation for a known or desired frequency of operation. The tailpipe length and geometry, as well as the combustion chamber geometry and fuel feed rates, cooperate to provide a resonant pulse combustion burner.

Typical examples of pulse combustion burners known heretofore are shown in U.S. Pat. No. 3,190,340 issued to Fritsch, U.S. Pat. No. 3,194,295 issued to Marchal et al., U.S. Pat. No. 3,192,986 issued to Haag, and U.S. Pat. No. 3,674,409 issued to Desty et al. Examples of deep fat fryers known heretofore are shown in U.S. Pat. Nos. 4,397,299 issued to Taylor et al., 3,760,793 issued to Anetsberger et al., 3,712,289 issued to Reid, Jr. et al. and 2,912,975 issued to Del Francia.

While pulse combustion processes have been known since the early 1900's, heaters utilizing these principals require large areas of space and can exhibit excessive noise levels as well as low efficiency levels. These drawbacks have heretofore rendered pulse combustion burners undersirable for utilization in heating units such as deep fat fryers which are used, for example, in fast food stores, restaurants and other commercial establishments.

Though the preferred embodiment of the invention is hereinafter described with particularity to a deep fat fryer, such description is for exemplary purposes only, and should not be interpreted as limiting in any sense in that many of the concepts disclosed herein have applications and alternative embodiments in pulse combustion burners in general.

SUMMARY OF THE INVENTION

The present invention provides an improved pulse combustion gaseous fuel heater particularly adapted for use in a deep fat fryer. According to one aspect of the invention a pulse combustion burner is disclosed which requires minimal space so as to be used in a conventional sized commercial deep fat fryer.

According to another aspect of the invention, a pulse combustion burner is shown having a configuration particularly arranged for improved noise reduction and heat exchange efficiency in a deep fat fryer.

According to yet another aspect of the invention a pulse combustion burner is shown which provides improved automatic burner response time while maintaining the automatic electronic controls at acceptable operating temperatures.

Still a further aspect of the invention is a tailpipe design which improves the heat exchange efficiency between the pulse combustion burner and a heated medium such as cooking oil as well as improving the overall operating efficiency of the pulse combustion burner.

These and other aspects of the present invention will be more fully described and understood in the following specification in view of the accompanying drawings.

DESCRIPTION OF THE PREFERRED EMBODIMENT

Figure 1:
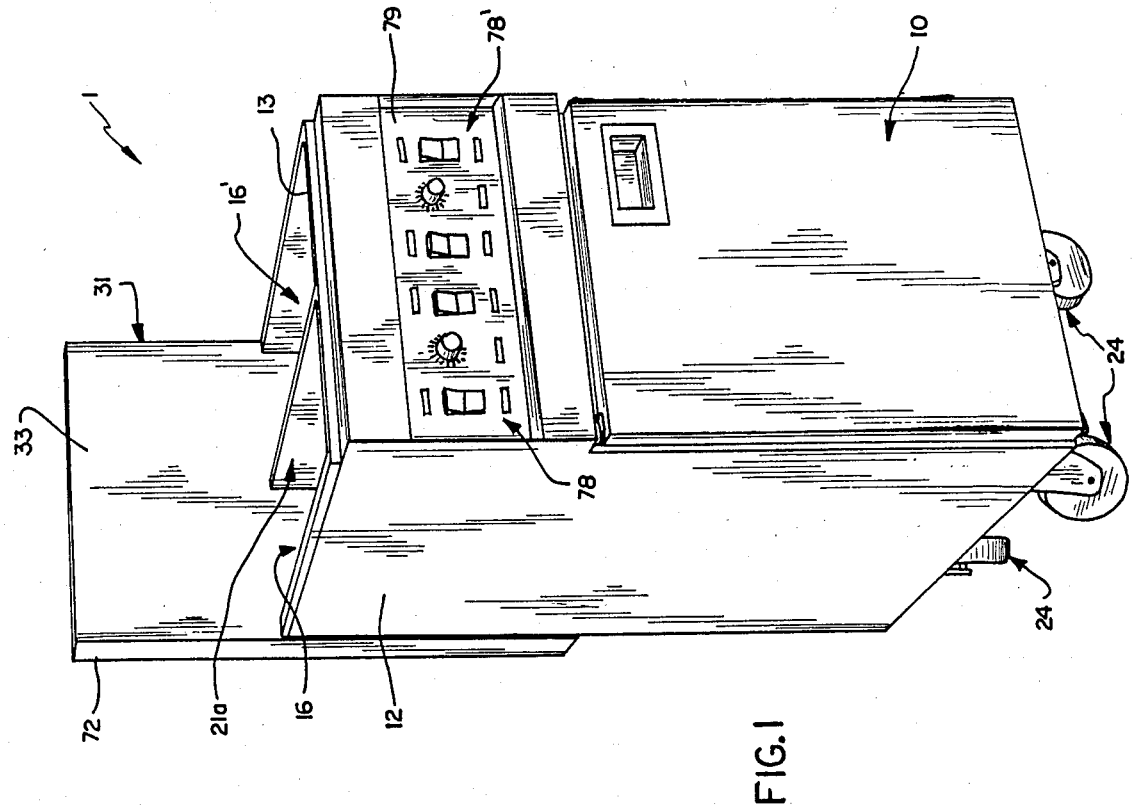
FIG. 1 is a perspective view of a deep fat fryer according to the concepts of the present invention.
Figure 2:
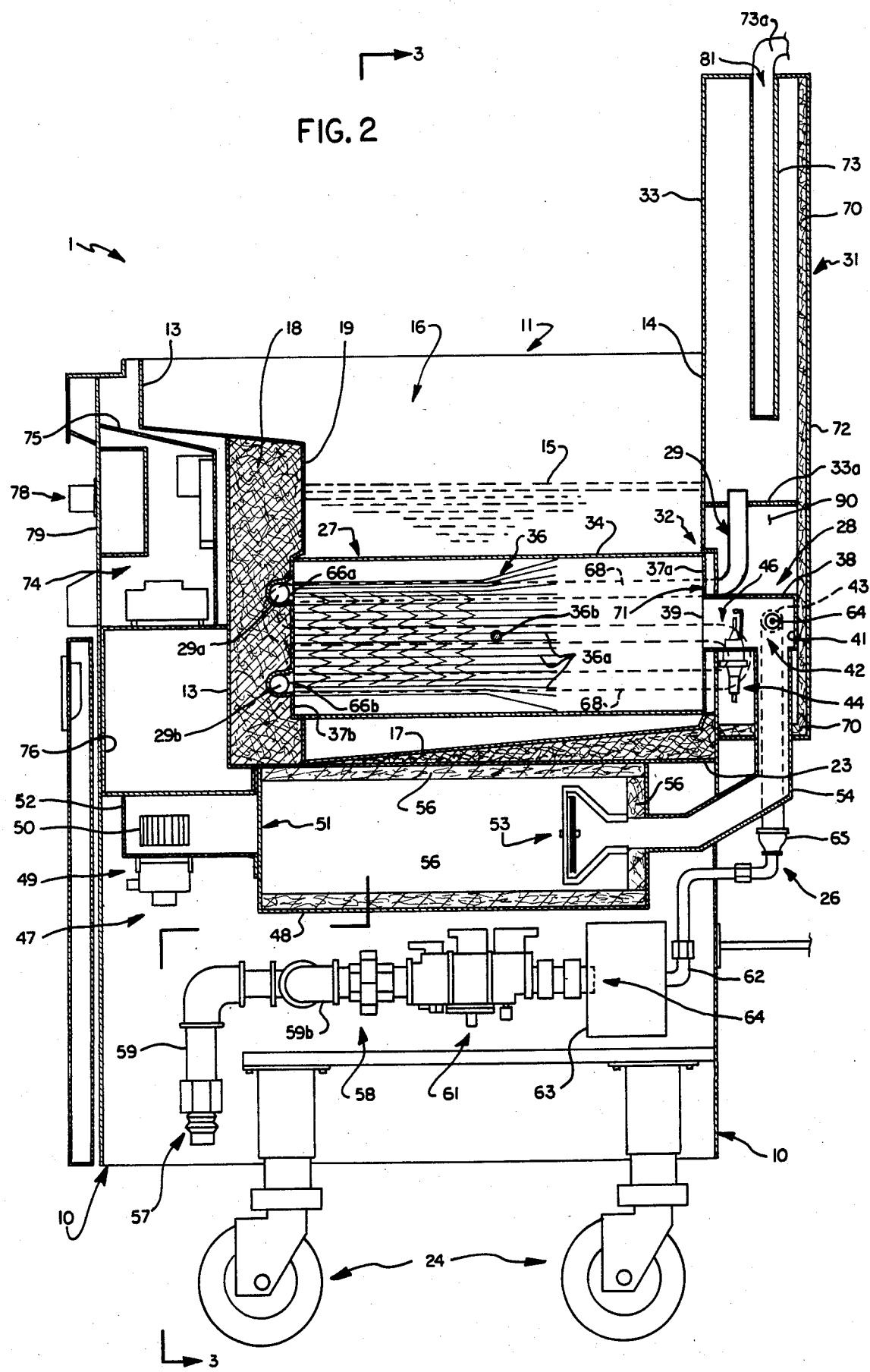
FIG. 2 is a schematic side elevation view of the deep fat fryer shown in FIG. 1, partially shown in section to illustrate certain features of the burner therein.
Figure 3:
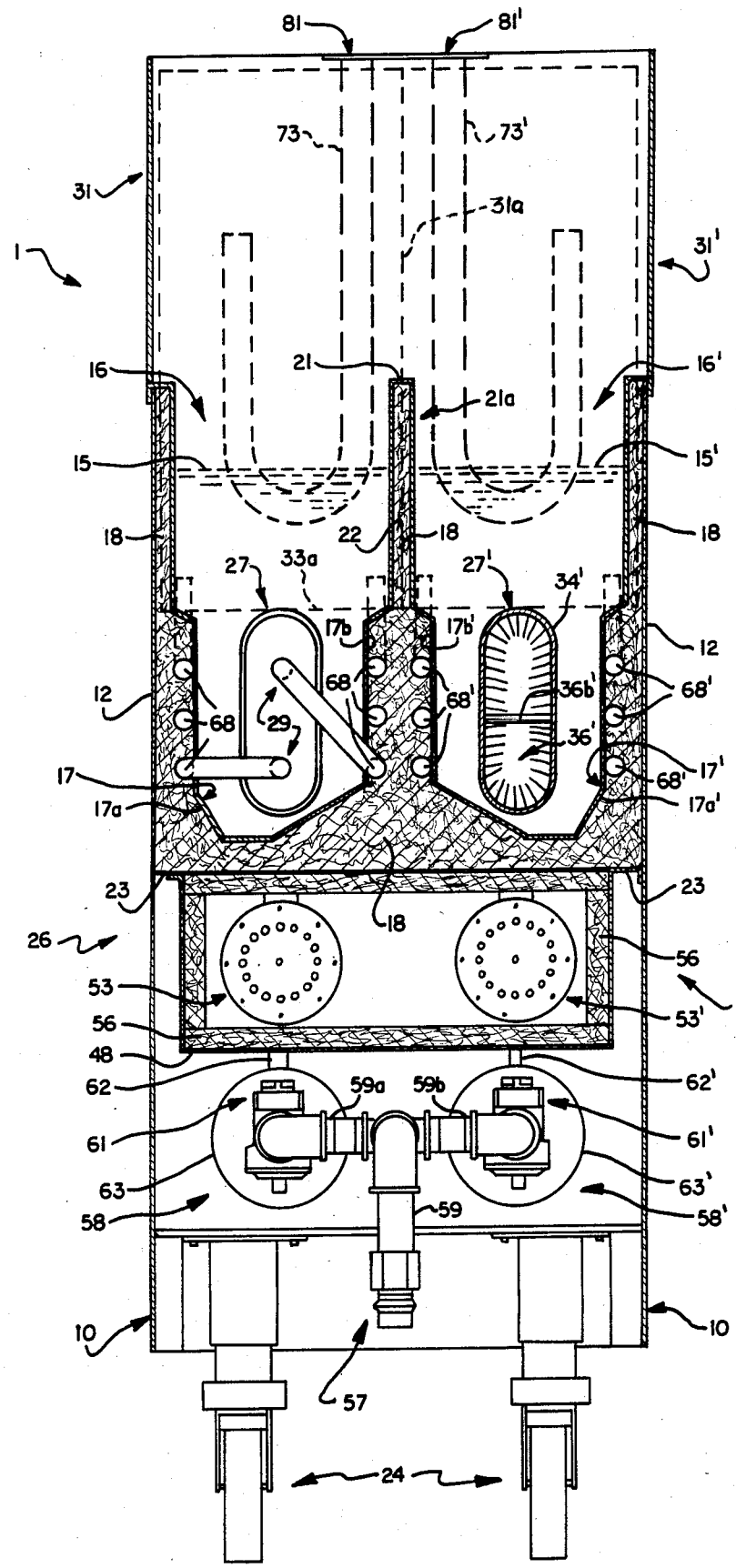
FIG. 3 is an end view of the fryer as shown in FIG. 1 partially shown in section along line 3—3 in FIG. 2.

A deep fat fryer according to the concepts of the present invention is generally indicated by the numeral 1 in FIGS. 1–3. The fryer 1 is housed in a cabinet 10 and includes an open top vessel or vat 11 which is generally rectangular in shape having two external opposed sidewalls 12, a front wall 13 and a back wall 14. The cabinet 10 is of standard commercial size. The vessel 11 is located at a counter height of about 36" and the cabinet 10 has a width of approximately 15" and a depth of approximately 28".

Because many of the elements or features of the preferred embodiment are provided in duplicate (for example, two burners, two cooking compartments and so on), the described elements will be identified by a numeral and the like elements will be identified by the same numeral followed by a prime.

Figure 4:
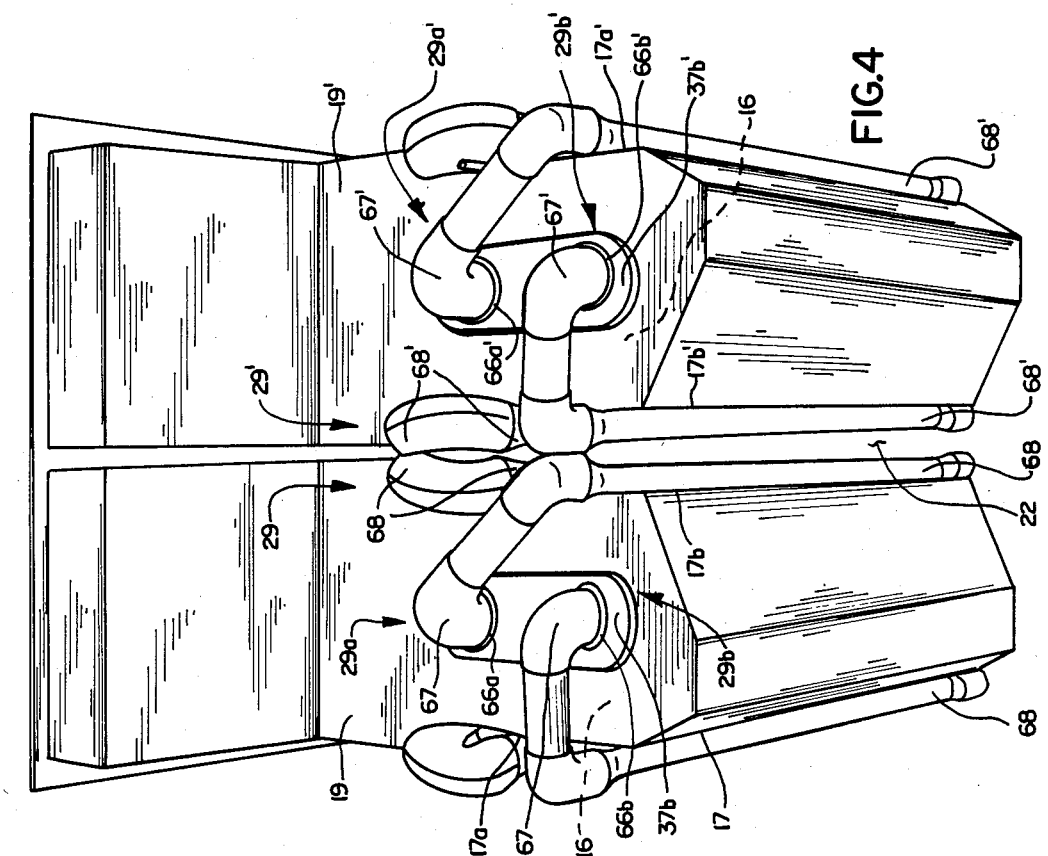
FIG. 4 is a perspective view of a heating container adapted to be used in the fryer shown in FIG. 1 illustrating a particular tailpipe configuration.

As best shown in FIG. 3, with a split vat design, the vat 11 is partitioned into heating or cooking compartments 16 and 16' by two adjacent interior troughshaped containers 17 and 17' (also see FIG. 4). The enclosed containers 17 and 17' are made fo a suitable material such as stainless steel and are adapted to hold a quantity of cooking oil or other fluid medium 15 to be heated. Each container 17 extends from just behind the front wall 13 to the back wall 14 and are sealed in a fluidtight manner therewith. A suitable heat insulating material 18 such as fiberglass is disposed between the outer surfaces of containers 17 and the inner surfaces of the sidewalls 12 so that the externally exposed walls 12 are not heated to the elevated temperatures of the medium 15. The insulation material 18 is also placed between the vat front wall 13 and the forward panels 19 (FIG. 2) of the containers 17 to retard conductive heat loss through the front wall 13 and to protect electronic components located near the front wall 13 as will be described in greater detail hereinbelow.

The containers 17 and 17' are joined along the top 21 of their adjacent interior sides and thereby form a partition 21a with a space 22 formed therebetween. The insulative material 18 is also placed within space 22 to further minimize heat loss from the heating compartments 16. Thus, two separate cooking compartments 16 and 16' are provided and as will be apparent from the following can be operated at different temperatures, each independently of the other. However, by removing the partition 21a, the vat 11 may provide a single cooking compartment with one or more pulse combustion heaters disposed therein.

The vat 11 is supported on a horizontal floor portion 23 which is part of the structural housing cabinet 10. Of course, the sidewalls 12 can be made integral with the outside walls of the cabinet 10. The cabinet 10 is provided with a plurality of casters 24 in a known manner to permit mobility of the fryer 1 by rolling movement of the fryer to a desired location in the particular establishment wherein the fryer will be used. The cabinet 10 provides both a structural support for the vat 11 as well as a framework for various elements of the pulse combustion burners as will be described later.

The fryer 1 operates with a pair of substantially similar pulse combustion burners or heaters 26 and 26' (FIG. 3) each of which includes a pulse combustion chamber 27, an air-fuel mixer head 28, a dual tailpipe 29 having tailpipe portions 29a and 29b, and an exhaust decoupler 31. A separate exhaust decoupler is preferably used for each burner, the decouplers 31, 31' are separated by a common wall which is schematically shown at 31a. (For clarity of illustration, the decoupler walls 31a, 33 and the insulation material, such as glass fiber, extending along the interior surfaces of the exterior walls of the decouplers are shown only by dotted lines in FIG. 3). Since the burners 26 are substantially the same, a detailed description of only one of the burners will suffice for a thorough and complete understanding of the structure and operation of the fryer 1.

Each pulse combustion chamber 27 is positioned and mounted longitudinally in its respective container 17 near the bottom thereof, and extends lengthwise from the forward wall 19 to a lower portion 32 of the front wall 33 of the exhaust decoupler 31. The combustion chambers 27 are disposed generally parallel and intermediate to the sidewalls 12 and the partition 21a. Each pulse combustion chamber 27 is preferably oval in section to increase heat exchange efficiency and includes an imperforate wall portion 34 which provides a passageway for the combustion products. The combustion chamber configuration in combination with the tailpipe provides the resonant structure to sustain the pulse combustion process.

The chamber 27 is submerged in the medium 15 located within the cooking compartments 16 such that substantially all the outer surface area of the wall portion 34 is in direct heat exchange contact with the medium 15. Thus, the wall portion 34 acts to transfer the heat generated by the combustion gases to the fluid medium by thermal conduction. To enhance this heat exchange process and substantially improve heater efficiency, each pulse combustion chamber 27 is provided with internal baffle means 36 extending into the chamber passageway to promote turbulance of the combustion gases and scrubbing of the gas boundary layers adjacent the internal surface of the wall portions 34 by increasing the effective internal surface area of the pulse combustion chamber 27.

The baffle means 36 comprises a plurality of rigid members 36a mounted to the internal surface of the wall portion 34. The rigid members 36a are spaced from a location of maximum temperature which occurs downstream of the inlet 39 at a distance equal to about $\frac{1}{3}$ of the length of the chamber 27. Each of the rigid members 36a has an upright portion which is tapered adjacent the inlet 39 and those members extending along the major planar regions of the wall portion 34 include angulated tabs. Each of the tabs extends on opposite sides of a plane passing through the upright portion of the rigid member 36a. As shown, the rigid members extend across about 80% of the minimum transverse dimension of the chamber 27 and cooperate to increase the effective internal surface area of the wall portion by 300 to 400%. Specific details of providing the pulse combustion chamber with a baffle means 36 are disclosed in our copending application Ser. No. 734,284, filed May 15, 1985.

The baffle means 36 may also serve to structurally connect the opposed planar regions of the wall portion 34 for purposes of reducing vibrations and noise during pulse combustion. Further, a separate reinforcing element such as rod member 36b may be used.

Each combustion chamber 27 is closed in a fluid-tight manner at the inlet and exhaust ends by a pair of end plates 37a and 37b respectively.

Each mixer head 28 is a cylindrical tube 38 having an open end connected in a fluidtight manner to an opening 39 in the end plate 37a at the inlet to the combustion chamber 27. The opposite end of the mixer head 28 is closed in a fluidtight manner by a circular plate 41. An air inlet opening 42 and a fuel inlet opening 43 are provided through the wall of the tube 38. The air and fuel inlets are preferably perpendicular to each other to enhance thorough mixing of the combustible elements. An ignitor 44, for example an automotive spark plug, is mounted on the mixer head 28 with the ignitor electrode 46 disposed within the mixer head 28 near the combustion chamber inlet 39. A flame sensor is preferably integrally formed in a known manner with the ignitor 44 and detects an absence of proper combustion. Related controls (not shown) shut off the flow of fuel in a known manner when the pulse combustion process fails to start or fails to sustain itself as detected by the sensor.

Air for the combustion process in each burner 26 is fed to the mixer head 28 from an air supply assembly 47. The air supply assembly 47 includes an air box 48 conveniently located in an intermediate portion of cabinet 10 just below the vat 11 (see FIG. 3). A conventional air blower 49 is operated continuously and provides a steady supply of pressurized air to the air box 48 through an opening 51. The blower 49 has its fan portion 50 contained in an enclosed chamber 52 in fluid communication with opening 51 to channel the air into the air box 48. A flapper valve 53 allows an adjustable flow of air to exit the air box 48 through an air pipe 54 and prevents the flow of air or other gases from the pipe 54 into the air box 48, in a known manner. The air box 48 encloses the flapper valve 53 thereby reducing noise levels. The other end of the air pipe 54 is connected in fluidtight communication with the air inlet 42 in the mixer head 28. An insulative material 56 such as foam rubber or fiberglass with sealed or hardened surfaces is provided about the interior of the air box 48 to further reduce noise.

A separate blower 49 and air box 48 is used for each burner 26 in the fryer 1, and a separate flapper valve 53 and air pipe 54 is preferably used to supply air to the respective mixer head 28 for each of the two burners 26 in the fryer, as shown in FIG. 3.

Referring to FIGS. 2 and 3, a conventional hose coupling 57 provides an inlet to a pair of substantially identical fuel line assemblies 58 and 58' for a combustible fuel such as natural gas. The main gas line 59 is coupled in a known manner to two lines 59a and 59b in the assemblies 58 to provide respective gas lines for each mixer head 28 of the two burners 26 and 26' in the fryer. A control valve 61 in each assembly 58 allows an adjustable inward flow of fuel to a gas feed line 62 and prevents outward flow of gases in a known manner. A gas decoupler 63 is provided in each gas line 59 between the valve 61 and the gas feed line 62 to desensitize back pressure effects on the valve 61 in a known manner. A plurality of orifices 64 may also be provided in the fuel line assembly 58 in a known manner to further desensitize back pressure effects on the valve 61 and hence reduce the size requirements of the gas decoupler 63.

The gas feed line 62 provides fluidtight communication of the fuel from the decoupler 63 to the gas inlet 43 in the mixer head 28 through one of the orifices 64.

A gas flapper valve 65 is provided in the gas feed line 62 and allows an adjustable flow of fuel from the decoupler 63 to the mixer head 28 and prevents the back flow of gases into the decoupler 63 in a known manner.

The fuel line assembly 58 just described is conveniently located within the cabinet 10 just below the air box 48. The vertical "stacking" arrangement of the vat 11, the air supply assembly 47 and the gas line assemblies 58, as best shown in FIG. 3, results in a compact arrangement requiring minimal space for the fryer 1.

The exhaust end of the combustion chamber 27 is closed by the end plate 37b as previously described. The end plate 37b is mounted to the front wall 19 and is provided with openings 66a and 66b which act as dual exhaust ports for the combustion gases and by-products. A pair of dual tailpipe 29a and 29b are respectively connected in fluidtight communication with the exhaust ports 66a and 66b for each combustion chamber 27 and receive the combustion gases expelled therefrom.

As best shown in FIG. 4, each dual tailpipe 29 has preferably a convoluted tailpipe configuration that is arranged in multiple passes along the outer surface of the vat sidewalls 17a and 17b. Two ell fittings 67 are connected at one end to their respective exhaust ports 66 in a fluidtight manner and connected at the other end to elongated serpentine exhaust channels 68 which are attached to the outer surface of the containers 17 and 17' as illustrated. The dual tailpipe channels 68 provide conduits for the combustion gases exiting each combustion chamber 27 to pass back and forth along either side of the respective container 17 wall. Because the tailpipes 29 are preferably integral with the container 17 wall, the heat of the exhaust gases which pass down the channel 68 portions of the tailpipe 29 is exchanged with the fluid medium which fills the cooking compartments 16. This arrangement of making the tailpipe part of the vat wall improves the overall efficiency of the fryer by providing direct heat exchange between the exhaust gases and the medium, which heat would otherwise be vented and lost.

As shown in phantom in FIG. 2, the dual tailpipes 29 direct the combustion gases in a direction back and forth along the container wall 17 and ends at outlets 71 within the exhaust decoupler 31. The end plate 37a is positioned adjacent to and abutting a fluidtight manner the rear vat wall 14.

Each exhaust decoupler 31 is generally a fluid-tight box-like structure. A separate removable cabinet back panel 72 is provided for easy access to the ignitor 44 and the mixer head 28. A suitable insulating material 70 such as glass fiber is provided for noise reduction and heat shielding. The exhaust decouplers 31, 31' are separated by wall 31a to independently receive the exhaust gases from each pulse combustion burner 26.

It is to be noted that preferably the hot mixer head 28 is completely enclosed by the cabinet back panel 72 within an enclosed area 90 below the decoupler 31. Of course, the area 90 can be made continuous with the interior area of the exhaust decoupler 31 by removing the bottom panel 33a. This configuration allows for size reduction of the fryer 1 and improves noise reduction and heater efficiency. As will be detailed hereinbelow, enclosing the mixer head in the exhaust area also prevents undesirable heating of the electronic controls.

One or more exhaust or vent pipes 73 are disposed within the decoupler 31 and act to reduce noise levels as well as vent the exhaust gases through ports 81. The vent pipe 73 has a U shaped inlet portion as shown in FIG. 3. (This inlet portion is omitted in FIG. 2 for clarity). The outlet portion 73a of the vent pipe may be exhausted to the outside by any convenient means. An advantage of using the decoupler 31 is to isolate the resonant combustion system so that the pulse combustion process is insensitive to the length of the exhaust pipes 73.

By placing the exhaust pipe within the decoupler it is possible to place the fryer 1 adjacent an outside wall (not shown) of the establishment and directly vent therethrough without the need of a long external exhaust pipe; thus, the length of the external vent pipe in such case would be about the thickness of the outside wall.

The substantial size reduction of the pulse combustion burner is in part due to the vertical stacking arrangement described previously and the enclosing of the mixer head and exhaust pipe in the exhaust area. This allows a pulse combustion burner to be used within the space requirements of a commercial deep fat fryer.

An electronic control circuit is generally indicated by the numeral 74 in FIG. 2 and includes the necessary logic circuits for automatic and thermostatic control of the fryer 1 in a known manner. The control circuits are housed in a ventilated control box 75 located in an upper frontal portion of the cabinet 10 in front of the cooking compartments 16. A thermostatic sensor detects the temperature of the medium and controls the on/off operation of the fryer 1 by regulating the flow of combustible fuel and initiation of combustion by ignitor 44. Preferably, the control circuit 74 consists of one or more solid state devices to minimize space requirements. Solid state devices, however, are sensitive to their operating environment temperature and can operate improperly or fail if overheated. Thus, the control circuit 74 is positioned within the cabinet 10 but remote from the mixer head 28, the exhaust decoupler 31 and the exhaust pipe 73. An air duct 76 permits air from continuously operating blower 49 to be vented across the circuit 74 to cool the electronic components, thereby obviating the need for a second dedicated fan for cooling the circuit 74.

Preferably, two control circuits 74 and 74' are provided for separately controlling the temperature of the medium 15 in each of the respective containers 17 and 17'. The respective switches, knobs, indicator lights and other associated controls 78 for each control circuit 74 are located on a control panel 79 as best shown in FIG. 1. Thus, either or both of the burners can be utilized at any given time and can heat the respective medium in compartments 16 and 16' to a desired and individually controlled temperature.

For operation of the pulse combustion deep fat fryer 1, combustible fuel is supplied to the mixer heads 28 through the gas feed lines 62 from the gas line assemblies 58 and air is supplied through the air lines 54 from the air line assemblies 47. On start up, the airfuel mixtures are ignited by the spark plugs 44 which are triggered by the control circuits 74. Ordinarily, during use of the fryer 1, the cooking oil is maintained at a temperature of between 275° F. and 375° F. Thermostatic controllers sense the temperature of the oil in the containers 17 in a known manner and related controls (not shown) supply the fuel to the mixer head 28 when heating of the oil is required. The fryer 1 is designed to operate at about a 30,000 BTU/hr. input rate but this rate may be varied in a known manner.

Once initiated by the spark plug 44, pulse combustion in the combustion chamber 27 continues as long as fuel is supplied. Positive pressure in the combustion chamber closes the air and gas flapper valves, 53 and 61 respectively, and the combustion products are expelled through dual tailpipes 29 and thereafter vented out the exhaust pipe 73 in the decoupler 31. The expulsion of the combustion products and acoustic pressure waves create a negative pressure in the combustion chamber 27 and the mixer head 28 thereby opening the air and gas flapper valves and drawing a fresh air-gas mixture into the mixer head 28. The combustion process is self-sustaining so long as fuel is supplied without further need of the spark plug.

The hot combustion gases heat the surrounding medium via thermal conduction through the combustion chamber wall 34, the dual tailpipes 29 in the walls of the container 17 and the decoupler 31 as previously described. When the thermostatic controls sense the oil has reached the desired temperature, the fuel supply is cut off and the pulse combustion process stops. When the oil temperature drops below a predetermined level the control circuit 74 once again initiates the pulse combustion process.

In order to achieve the cyclic pulse combustion operation, the length and cross-sectional geometries of the resonant pulse combustion system including the tailpipe and combustion chamber as well as the fuel/air feed rates, must be tuned in a known manner according to the Hemholtz equation, to achieve a resonant pulse combustion burner having a particular frequency of operation.

By operating the air blower 49 continuously, the response time of the pulse combustion burner to a "call for heat" is substantially reduced because there is no delay on the order of 4 to 5 seconds waiting for the blower to come up to speed. The blower 49 also provides a good supply of pressurized air flow for initiating combustion.

Although the preferred embodiment of this invention has been shown and described, it should be understood that various modifications and rearrangements of the parts may be resorted to without departing from the scope of the invention as disclosed and claimed herein.

What is claimed is:

1. A deep fat fryer comprising an open-top vessel adapted to hold a quantity of cooking oil, a pulse combustion heater for heating the oil in said vessel and a cabinet structure for supporting the vessel and the heater, said cabinet structure including a front wall arranged for user access to the cooking oil and a remote back wall, said heater including a combustion chamber having an inlet and an outlet, said heater further including a mixer head connected to said inlet of said combustion chamber, means for supplying controlled air and fuel flows to said mixer head, an ignitor for initiating combustion, and a tailpipe connected at one end to said outlet of said combustion chamber for receiving combustion products and at the other end to an exhaust decoupler means for venting combustion products, said combustion chamber and tailpipe coacting to form a self-sustaining, resonant pulse combustor which self-exhausts combustion gases and self-feeds air and fuel, said vessel including a vessel wall for confining the oil, said combustion chamber being adapted to be immersed in the oil and having an imperforate wall portion providing heat exchange between combustion products passing through the combustion chamber and the oil, said tailpipe extending along an exterior side of said vessel wall and providing heat exchange between combustion products passing through the tailpipe and the oil, said combustion chamber inlet, mixer head and exhaust decoupler means being located adjacent said back wall of said cabinet, said exhaust decoupler means enclosing at least a portion of a vent pipe for minimizing the space requirements and noise levels of the fryer.

2. A deep fat fryer according to claim 1, wherein said exhaust decoupler means has a rectangular box-like configuration including a width substantially corresponding with the width of said cabinet and a height extending above the vessel, and said mixer head is located underneath said exhaust decoupler means.

3. A deep fat fryer according to claim 1, wherein dual tailpipes are provided for said combustion chamber.

4. A deep fat fryer according to claim 1, further comprising electronic control means for regulating the temperature of the oil and controlling the operating periods of the heater, said electronic means being located in said cabinet structure remote from said exhaust decoupler, wherein said means for supplying controlled air flow includes an air blower continuously operated to provide pressurized air for combustion startup and a flow of air directed towards said electronic means for cooling the same.

5. A deep fat fryer according to claim 1, wherein said vessel is partitioned into two trough-shaped containers, each of said containers being adapted to hold a quantity of cooking oil and having a combustion chamber disposed therein, and means for separately controlling the oil temperature in the respective containers.

6. A deep fat fryer according to claim 1, wherein said controlled air flow means includes an air line connected at one end to an air inlet in said mixer head and at the other end to an air box enclosing air valve means for regulating the flow of air from said box to said air line, and blower means continuously operating to supply pressurized air to said air box, said air box and blower means being located below said vessel and supported by said cabinet structure.

7. A deep fat fryer according to claim 6, wherein said controlled fuel flow means includes a fuel feed line connected at one end to a fuel inlet in said mixer head and connected at the other end to a fuel decoupler and a fuel valve means for regulating the flow of fuel to said feed line, said fuel valve means and fuel decoupler being supported in said cabinet structure below said vessel.

8. A deep fat fryer according to claim 1, wherein said exhaust decoupler means is positioned adjacent said combustion chamber inlet and has a common wall area integrally formed with a wall area of said vessel to provide heat exchange between said combustion products and the oil.

9. A deep fat fryer according to claim 8, wherein said combustion chamber is an elongated member having said inlet and outlet at respective ends thereof and said vessel wall is disposed near and generally longitudinally parallel to said combustion chamber, said tailpipe extending in a convoluted configuration along said vessel wall and in thermal contact therewith to provide heat exchange between said combustion products and the cooking oil.

10. A deep fat fryer according to claim 9, wherein a portion of said tailpipe forms part of said vessel wall portion.

11. A deep fat fryer comprising an open-top vessel adapted to hold a quantity of cooking oil, a pulse combustion burner for heating the oil, electronic means for regulating the temperature of the oil and for controlling the operating periods of said burner, and cabinet means for supporting said vessel, burner and electronic means, wherein said cabinet means includes a front wall arranged for user access to the oil and a remote back wall, said burner includes at least one combustion chamber adapted to be immersed in the oil and to provide heat exchange between combustion products and the oil, a mixer head connected to an inlet end of said chamber, means for supplying controlled air and fuel flows to said mixer head, said air flow means located substantially below said vessel in said cabinet means and having an air blower continuously operating for providing pressurized air to said mixer head and for providing a flow of air directed towards said electronic means to cool the same, said fuel flow means being supported in said cabinet means below said vessel, said burner further including a tailpipe for receiving said combustion products and being connected at one end to an outlet end of said combustion chamber and at the other end to an exhaust decoupler means for exhausting the combustion products, said tailpipe and combustion chamber cooperating to provide self-sustaining, pulse combustion of said air/fuel mixture including self-exhausting of said combustion products and self-feeding of said air and fuel, said tailpipe extending along an exterior portion of said vessel in thermal contact therewith and providing heat exchange between said combustion products and the oil, said exhaust decoupler means being positioned adjacent said combustion chamber inlet end and mixer head adjacent said back wall of said cabinet means, whereby said cabinet means is at least as small as a commercial deep fat fryer having an atmospheric burner.

12. A deep fat fryer according to claim 11, wherein said exhaust decoupler means extends in a vertical direction beyond said vessel and said mixer head is located underneath said exhaust decoupler means.

13. A deep fat fryer according to claim 12, wherein said exhaust decoupler means has a width substantially equal to the width of said cabinet means and said cabinet means includes a rear panel for enclosing said exhaust decoupler means and mixer head.

14. A pulse combustion heating apparatus comprising a pulse combustion burner, a vessel for containing a liquid to be heated and a cabinet for supporting said burner and vessel, said burner comprising a combustion chamber having an inlet and an outlet, a mixer head connected to said inlet, means for supplying controllable flows of air and fuel to said mixer head, means for igniting said air/fuel mixture in one of said mixing head and combustion chamber, exhaust means connected to said combustion chamber outlet, said combustion chamber and exhaust means cooperating to provide a self-sustaining, resonant combustion of said air/fuel mixture including self-exhausting of combustion gases and self-feeding of air and fuel, said exhaust means including at least one tailpipe connected at one end to said combustion chamber outlet and at the other end to an exhaust decoupler adjacent said combustion chamber inlet and said mixer head, and a vent pipe connected to said exhaust decoupler for receiving combustion gases therefrom and discharging them into the atmosphere, said vessel including a vessel wall portion for confining the liquid to be heated, said combustion chamber including an imperforate wall portion extending within said vessel to provide heat transfer between combustion gasses passing through the combustion chamber and the liquid to be heated, said tailpipe extending along an exterior side of said vessel wall portion to provide heat transfer between combustion gases passing through the tailpipe and the liquid to be heated, said cabinet including a front wall arranged for user access to the liquid and a remote back wall, said combustion chamber inlet, mixer head and exhaust decoupler being mounted adjacent said back wall of said cabinet, said exhaust decoupler extending in a vertical direction beyond said vessel and above said mixer head.

15. A pulse combustion heating apparatus according to claim 14, wherein a portion of said vent pipe is enclosed within said exhaust decoupler and has a U-shaped inlet whereby the size and noise of the burner are reduced.

16. A pulse combustion heating apparatus according to claim 14, further comprising electronic means for controlling operating periods of the burner and blower means operating continuously to provide pressurized air to said air supply means to minimize burner response time and to provide a flow of air towards said electronic means to cool the same.

17. A pulse combustion heating apparatus according to claim 14, further comprising electronic means for controlling operating periods of the burner and blower means to provide pressurized air to said air supply means and to provide a flow of air towards said electronic means to cool the same, said electronic means being mounted in said cabinet adjacent said front wall, said air supply means including an air supply pipe connected at one end to said mixer head and at its other end to an air box mounted in said cabinet structure below said vessel, said blower means being mounted in said cabinet between said electronic means and air box and operably connected to supply cooling air to the electronic means to maintain a supply of pressurized air in the air box.

18. A pulse combustion heating apparatus according to claim 14, wherein a portion of said vent pipe is enclosed by said exhaust decoupler in order to reduce the external length of vent pipe required for providing said self-sufficient resonant combustion.

19. A pulse combustion heating apparatus according to claim 18, wherein a second tailpipe is provided, said combustion chamber outlet being arranged for connection to both of said tailpipes and for distribution of combustion gases therebetween.

20. A pulse combustion heating apparatus according to claim 14, wherein said exhaust decoupler has a width substantially corresponding with that of said cabinet and a rear panel is provided for enclosing said exhaust decoupler and mixer head.

21. A pulse combustion heating apparatus according to claim 20, wherein said exhaust decoupler has a rectangular box-like configuration and a width substantially corresponding with the width of said cabinet.

22. In a pulse combustion burner having a combustion chamber, means for supplying a controllable air/fuel mixture to said chamber, ignitor means for initiating combustion, exhust means for venting combustion products, said exhaust means and combustion chamber forming a self-sustaining, resonant pulse combustion system including self-exhausting of combustion products and self-feeding of air and fuel and electronic means for controlling the operating periods of the burner, the improvement comprising an air blower operated continuously and providing pressurized air to said supply means to minimize burner start-up time and a flow of air directed towards said electronic means to cool the same.

* * * * *